(12) United States Patent
Weber et al.

(10) Patent No.: US 8,759,458 B2
(45) Date of Patent: Jun. 24, 2014

(54) METHOD FOR PRODUCING POLY(ARYLENE ETHER) BLOCK COPOLYMERS

(75) Inventors: Martin Weber, Maikammer (DE); Christian Schmidt, Ludwigshafen (DE); Alexander Khvorost, Moskau (RU); Cecile Gibon, Mannheim (DE); Christian Maletzko, Altrip (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/376,665

(22) PCT Filed: Jun. 2, 2010

(86) PCT No.: PCT/EP2010/057676
§ 371 (c)(1),
(2), (4) Date: Dec. 7, 2011

(87) PCT Pub. No.: WO2010/142585
PCT Pub. Date: Dec. 16, 2010

(65) Prior Publication Data
US 2012/0083579 A1    Apr. 5, 2012

(30) Foreign Application Priority Data
Jun. 8, 2009   (EP) .................................. 09162139

(51) Int. Cl.
*C08G 75/23* (2006.01)

(52) U.S. Cl.
USPC .......................................... 525/534; 528/219

(58) Field of Classification Search
USPC ....................................................... 521/180
See application file for complete search history.

(56) References Cited

U.S. PATENT DOCUMENTS

| | | | |
|---|---|---|---|
| 4,200,728 A | 4/1980 | Blinne et al. | |
| 4,751,274 A * | 6/1988 | Ittemann et al. | 525/534 |
| 6,593,445 B2 | 7/2003 | Schwab | |
| 2002/0010307 A1 | 1/2002 | Schwab | |
| 2005/0159562 A1 * | 7/2005 | Hayashi et al. | 525/534 |
| 2010/0184898 A1 | 7/2010 | Weber et al. | |
| 2010/0190897 A1 | 7/2010 | Maletzko et al. | |
| 2010/0197859 A1 | 8/2010 | Weber et al. | |
| 2010/0286303 A1 | 11/2010 | Weber et al. | |
| 2011/0009566 A1 | 1/2011 | Jain et al. | |
| 2011/0155309 A1 | 6/2011 | Steininger et al. | |
| 2011/0196098 A1 | 8/2011 | Mettlach et al. | |
| 2011/0201747 A1 | 8/2011 | Weber et al. | |
| 2011/0218294 A1 | 9/2011 | Weber et al. | |
| 2011/0224386 A1 | 9/2011 | Weber et al. | |
| 2011/0237693 A1 | 9/2011 | Weber et al. | |
| 2011/0237694 A1 | 9/2011 | Weber et al. | |
| 2011/0244743 A1 | 10/2011 | Scherzer et al. | |
| 2011/0251337 A1 | 10/2011 | Weber et al. | |
| 2011/0294912 A1 | 12/2011 | Weber et al. | |
| 2011/0319550 A1 | 12/2011 | Weber et al. | |
| 2012/0029106 A1 | 2/2012 | Weber et al. | |
| 2012/0059109 A1 | 3/2012 | Weber et al. | |

FOREIGN PATENT DOCUMENTS

| | | | |
|---|---|---|---|
| DE | 1957091 A1 | 6/1970 | |
| EP | 000361 A1 | 1/1979 | |
| EP | 1272547 A2 | 1/2003 | |
| GB | 1264900 A | 2/1972 | |
| JP | 2003096219 A | 4/2003 | |
| JP | 2003155361 A | 5/2003 | |
| WO | WO-00/18824 A1 | 4/2000 | |
| WO | WO-2005095491 A1 | 10/2005 | |
| WO | WO 2005095491 A1 * | 10/2005 | ............ C08G 75/20 |
| WO | WO 2009/003901 | 1/2009 | |
| WO | WO 2009/034114 | 3/2009 | |
| WO | WO 2010/089241 | 8/2010 | |
| WO | PCT/EP2010/069644 | 12/2010 | |
| WO | WO 2011/000816 | 1/2011 | |
| WO | WO 2011/009798 | 1/2011 | |
| WO | WO 2011/051273 | 5/2011 | |
| WO | WO 2011/069892 | 6/2011 | |
| WO | WO 2011/073196 | 6/2011 | |
| WO | WO 2011/073197 | 6/2011 | |
| WO | WO 2011/117344 | 9/2011 | |

OTHER PUBLICATIONS

Hendrick et al. (Radiation Resistant Amorphous—All Aromatic Polyarylene Ether Sulfones: Synthesis, Characterization and Mechanical Properties, J. Polymer Science: Poly Chem Ed, 23 287-300 (1986); Published Feb. 1986).*
U.S. Appl. No. 61/316,848.
U.S. Appl. No. 13/267,628, filed Oct. 6, 2011, Scherzer et al.
U.S. Appl. No. 13/376,901, filed Dec. 8, 2011, Gibon et al.
U.S. Appl. No. 13/377,979, filed Dec. 13, 2011, Khvorost et al.
U.S. Appl. No. 13/382,782, filed Jan. 6, 2012, Scherzer et al.
U.S. Appl. No. 13/391,082, filed Feb. 17, 2012, Shahim et al.
U.S. Appl. No. 13/378,980, filed Mar. 1, 2012, Schmidt et al.

* cited by examiner

*Primary Examiner* — Randy Gulakowski
*Assistant Examiner* — Christopher M Rodd
(74) *Attorney, Agent, or Firm* — Drinker Biddle & Reath LLP

(57) ABSTRACT

The present invention relates to a process for the production of polyarylene ether block copolymers comprising, in a first stage, the reaction of at least one aromatic dihydroxy compound comprising 4,4'-dihydroxybiphenyl in a molar excess and of at least one aromatic dihalogen compound, to form a polybiphenyl sulfone polymer, and then, in a second stage, the reaction of the polybiphenyl sulfone polymer with at least one aromatic dihydroxy compound and of at least one aromatic dihalogen compound.

The invention further relates to the resultant polyarylene sulfone block copolymers and to the use of the polyarylene sulfone block copolymers for the production of moldings, fibers, films, or foams.

14 Claims, No Drawings

METHOD FOR PRODUCING POLY(ARYLENE ETHER) BLOCK COPOLYMERS

CROSS-REFERENCE TO RELATED APPLICATIONS

This application is a national stage application (under 35 U.S.C. §371) of PCT/EP2010/057676, filed Jun. 2, 2010, which claims benefit of European application 09162139.1, filed Jun. 8, 2009, the entire contents of each of which are incorporated herein by reference in their entireties.

FIELD OF THE INVENTION

The present invention relates to a process for the production of polyarylene ether block copolymers comprising, in a first stage, the reaction of at least one aromatic dihydroxy compound comprising 4,4'-dihydroxybiphenyl in a molar excess and of at least one aromatic dihalogen compound, to form a polybiphenyl sulfone polymer, and then, in a second stage, the reaction of the polybiphenyl sulfone polymer with at least one aromatic dihydroxy compound and of at least one aromatic dihalogen compound.

The invention further relates to the resultant polyarylene sulfone block copolymers and to the use of the polyarylene sulfone block copolymers for the production of moldings, fibers, films, or foams.

BACKGROUND

Polybiphenyl sulfone polymers belong to the polyarylene ether group, and are therefore engineering thermoplastics. Polybiphenyl sulfone polymers have not only high heat resistance but also superior notched impact resistance and excellent fire performance.

The production of polybiphenyl sulfone polymers is disclosed by way of example in DE 1957091 and EP 000361. WO 2000/018824 discloses a process for the production of polybiphenyl sulfone polymers with a very small proportion of cyclic oligomers. EP 1272547 describes polybiphenyl sulfone polymers with a particularly low level of intrinsic color, obtained via equimolar condensation of the monomers 4,4'-dihydroxybiphenyl and 4,4'-dichlorodiphenyl sulfone in the presence of fine-particle potash.

WO 2005/095491 discloses that block copolymers having various polyarylene ether segments can be produced via coupling of separately produced blocks. Disadvantages of this method are not only the high cost for industrial implementation of this synthetic strategy but especially the lack of control of the stoichiometry, particularly when the intention is to couple blocks having molar masses above 5000 g/mol, since the determination of the respective block lengths is subject to error, and this often makes it difficult or impossible to obtain the necessary precision in establishment of the block lengths and of the molecular weights obtainable.

Moreover many of the polybiphenyl sulfone block copolymers obtainable from the prior art moreover have inadequate notched impact resistance, or else inadequate optical properties.

BRIEF SUMMARY

An object of the present invention was therefore to provide a process which is easy to carry out and which produces block copolymers having blocks composed of polybiphenyl sulfone and other polyarylene ethers. The process was also intended to permit production of particularly high-molecular-weight polybiphenyl sulfone block copolymers.

Another object of the present invention was to provide polybiphenyl sulfone block copolymers which have superior mechanical properties, in particular high notched impact resistance. The intention was moreover that the polybiphenyl sulfone block copolymers have better optical properties than the known block copolymers, in particular higher transparency and lower light scattering.

The present object is achieved via a process for the production of polyarylene ether block copolymers comprising
(a) the reaction of components
(A1) composed of at least one aromatic dihydroxy compound and
(A2) composed of at least one aromatic dihalogen compound
to form a polybiphenyl sulfone polymer, where component (A1) comprises 4,4'-dihydroxybiphenyl and the reaction according to step (a) is carried out with a molar excess of component (A1), and then
(b) reaction of the polybiphenyl sulfone polymer with components
(B1) composed of at least one aromatic dihydroxy compound and
(B2) composed of at least one aromatic dihalogen compound.

The term polybiphenyl sulfone polymer means polyether sulfones which comprise 4,4'-dihydroxybiphenyl as monomer unit. Polybiphenyl sulfone itself is also known as polyphenylene sulfone and abbreviated to PPSU, and is composed of the monomer units 4,4'-dichlorodiphenyl sulfone and 4,4'-dihydroxybiphenyl.

DETAILED DESCRIPTION OF THE PREFERRED EMBODIMENTS

Preferred embodiments of the present invention are explained in more detail below. Individual preferred embodiments can be combined with others without exceeding the scope of the present invention.

Step (a)

According to the invention, component (A1) is composed of at least one aromatic dihydroxy compound, and comprises 4,4'-dihydroxybiphenyl. Component (A1) can moreover also comprise the following compounds:

dihydroxybenzenes, in particular hydroquinone and resorcinol;

dihydroxynaphthalenes, in particular 1,5-dihydroxynaphthalene, 1,6-dihydroxynaphthalene, 1,7-dihydroxynaphthalene, and 2,7-dihydroxynaphthalene;

dihydroxybiphenyl compounds other than 4,4'-biphenol, in particular 2,2'-biphenol;

bisphenyl ethers, in particular bis(4-hydroxyphenyl) ether and bis(2-hydroxyphenyl) ether;

bisphenylpropanes, in particular 2,2-bis(4-hydroxyphenyl)propane, 2,2-bis(3-methyl-4-hydroxyphenyl)propane, and 2,2-bis(3,5-dimethyl-4-hydroxyphenyl)propane;

bisphenylmethanes, in particular bis(4-hydroxyphenyl) methane;

bisphenylcyclohexanes, in particular bis(4-hydroxyphenyl)-2,2,4-trimethylcyclohexane;

bisphenyl sulfones, in particular bis(4-hydroxyphenyl) sulfone;

bisphenyl sulfides, in particular bis(4-hydroxyphenyl) sulfide;

bisphenyl ketones, in particular bis(4-hydroxyphenyl) ketone;

bisphenylhexafluoropropanes, in particular 2,2-bis(3,5-dimethyl-4-hydroxyphenyl)hexafluoropropane; and bisphenylfluorenes, in particular 9,9-bis(4-hydroxyphenyl)fluorene.

It is preferable that component (A1) comprises at least 50% by weight, in particular at least 60% by weight, particularly at least 80% by weight, of 4,4'-dihydroxybiphenyl. It is very particularly preferable that component (A1) is 4,4'-dihydroxybiphenyl, the resultant reaction product according to step (a) therefore being polyphenylene sulfone (PPSU).

According to the invention, component (A2) is composed of at least one aromatic dihalogen compound.

The person skilled in the art is aware of suitable aromatic dihalogen compounds. Particularly suitable compounds (A2) are dihalodiphenyl sulfones, such as 4,4'-dichlorodiphenyl sulfone, 4,4'-difluorodiphenyl sulfone, 4,4'-dibromodiphenyl sulfone, bis(2-chlorophenyl) sulfones, 2,2'-dichlorodiphenyl sulfone, and 2,2'-difluorodiphenyl sulfone.

The aromatic compounds of component (A2) are preferably selected from 4,4'-dihalodiphenyl sulfones, in particular 4,4'-dichlorodiphenyl sulfone or 4,4'-difluorodiphenyl sulfone.

In one very particularly preferred embodiment, component (A2) is 4,4'-dichlorodiphenyl sulfone.

The molar ratio of component (A1) to (A2) in step (a) is preferably from 1.005:1 to 1.2:1. Use of an excess of component (A1) serves to provide reactive functional groups which are further reacted in step (b) of the process of the invention. The excess component (A1) also contributes to a reduction in polymer-bonded chlorine content, in particular at high conversions.

The molar ratio of component (A1) to (A2) is in particular from 1.005 to 1.1. In one particularly preferred embodiment, the molar ratio of component (A1) to (A2) is from 1.005 to 1.08, in particular from 1.01 to 1.05, very particularly preferably from 1.015 to 1.04. This can give particularly effective control of molecular weight.

It is advantageous for the present invention to select the reaction conditions in step (a) in such a way that conversion (C) is at least 90%, in particular at least 95%, particularly preferably at least 98%. For the purposes of the present invention, conversion C is the molar proportion of reactive groups that have reacted (i.e. hydroxy groups and chloro groups).

The reaction in step (a) preferably takes place in a solvent which comprises NMP (N-methyl-2-pyrrolidone).

Surprisingly, it has been found that particularly low polymer-bonded chlorine content is found when the solvent used is a solvent which comprises N-methyl-2-pyrrolidone. Very particular preference is given to N-methyl-2-pyrrolidone as solvent. N-Methyl-2-pyrrolidone at the same time contributes to high conversion of components (A1) and (A2), since the reaction of the monomers used according to the invention proceeds particularly efficiently.

For the purposes of the present invention, solvents that can be used as an alternative to, or in a mixture with, N-methyl-2-pyrrolidone (NMP) are aprotic polar solvents other than NMP. The boiling point of suitable solvents here is in the range from 80 to 320° C., in particular from 100 to 280° C., preferably from 150 to 250° C. Examples of suitable aprotic polar solvents are high-boiling-point ethers, esters, ketones, asymmetrically halogenated hydrocarbons, anisole, dimethylformamide, dimethyl sulfoxide, N-ethyl-2-pyrrolidone, and sulfolane. However, particular preference is given to N-methyl-2-pyrrolidone (NMP) as solvent.

The reaction of the starting compounds preferably takes place in the presence of a base (Ba), in order to increase reactivity to the halogen substituents of the starting compounds (A2). It is preferable, starting from the abovementioned aromatic dihydroxy compounds (A1), to produce their dipotassium or disodium salts by adding a base (Ba), and react these with component (A2).

The base (Ba) is preferably used in a molar ratio of from 1 to 1.3 in relation to the molar amount of component (A1).

The bases are preferably anhydrous. Particularly suitable bases are anhydrous alkali metal carbonate, preferably sodium carbonate, potassium carbonate, or calcium carbonate, or a mixture of these, very particular preference being given to potassium carbonate, in particular fine-particle potassium carbonate. A particularly preferred combination is N-methyl-2-pyrrolidone as solvent and potassium carbonate as base.

The reaction of the starting compounds (A1) and (A2) is carried out at a temperature of from 80 to 250° C., preferably from 100 to 220° C., with an upper temperature limit imposed by the boiling point of the solvent.

The reaction time is preferably from 1 to 12 h, in particular from 3 to 8 h.

It has also proven advantageous, for the purposes of step (a), to adjust the amount of the polybiphenyl sulfone polymer, based on the total weight of the mixture composed of polybiphenyl sulfone polymer and solvent, to from 10 to 70% by weight, preferably from 15 to 50% by weight.

Step (b)

According to the invention, component (B1) is composed of at least one aromatic dihydroxy compound. The person skilled in the art is aware of suitable aromatic dihydroxy compounds, and these correspond to the compounds listed under component (A1).

However, it is preferable that component (B1) comprises no 4,4'-dihydroxybiphenyl.

Aromatic dihydroxy compounds preferred as component (B1) are in particular:

dihydroxybenzenes, in particular hydroquinone and resorcinol;

dihydroxynaphthalenes, in particular 1,5-dihydroxynaphthalene, 1,6-dihydroxynaphthalene, 1,7-dihydroxynaphthalene, and 2,7-dihydroxynaphthalene;

dihydroxybiphenyl compounds other than 4,4'-biphenol, in particular 2,2'-biphenol;

bisphenyl ethers, in particular bis(4-hydroxyphenyl) ether and bis(2-hydroxyphenyl) ether;

bisphenylpropanes, in particular 2,2-bis(4-hydroxyphenyl)propane, 2,2-bis(3-methyl-4-hydroxyphenyl)propane, and 2,2-bis(3,5-dimethyl-4-hydroxyphenyl)propane;

bisphenylmethanes, in particular bis(4-hydroxyphenyl)methane;

bisphenylcyclohexanes, in particular bis(4-hydroxyphenyl)-2,2,4-trimethylcyclohexane;

bisphenyl sulfones, in particular bis(4-hydroxyphenyl) sulfone;

bisphenyl sulfides, in particular bis(4-hydroxyphenyl) sulfide;

bisphenyl ketones, in particular bis(4-hydroxyphenyl) ketone;

bisphenylhexafluoropropanes, in particular 2,2-bis(3,5-dimethyl-4-hydroxyphenyl)hexafluoropropane; and bisphenylfluorenes, in particular 9,9-bis(4-hydroxyphenyl)fluorene.

Component (B1) is particularly preferably 4,4'-dihydroxydiphenyl sulfone.

According to the invention, component (B2) is composed of at least one aromatic dihalogen compound.

The person skilled in the art is aware of aromatic dihalogen compounds suitable as component (B2), and these correspond to the compounds listed under component (A2). Suitable compounds (B2) are in particular dihalodiphenyl sulfones, such as 4,4'-dichlorodiphenyl sulfone, 4,4'-difluorodiphenyl sulfone, 4,4'-dibromodiphenyl sulfone, bis(2-chlorophenyl) sulfones, 2,2'-dichlorodiphenyl sulfone, and 2,2'-difluorodiphenyl sulfone.

It is preferable that the aromatic dihalogen compounds (B2) are selected from 4,4'-dihalodiphenyl sulfones, in particular 4,4'-dichlorodiphenyl sulfone and 4,4'-difluorodiphenyl sulfone.

It is very particularly preferable that component (B2) is 4,4'-dichlorodiphenyl sulfone.

The conduct of process step (b) is analogous to that of step (a).

For the purposes of step (b), it is preferable that components (B1) and (B2) are added immediately to the reaction mixture from step (a). It is also preferable that the base (Ba) is added immediately to the reaction mixture from step (a).

An advantage of the process of the invention is that it allows the block lengths of the blocks, and in particular the block length of the polybiphenyl sulfone polymer blocks, to be established as desired. This leads to high uniformity of the resultant block copolymers and allows their physical properties to be controlled or established as desired.

To this end, the calculation of the respective amounts of components (B1), (B2), and base (Ba) takes into account the average block length and amount by weight of the components polycondensed in step (a). Assuming that the reaction in step (a) is quantitative (and ignoring any cyclic compounds that might form), the values for number-average molecular weight Mn and the amount of polymer are calculated and used as reference quantities. Starting from these values, the person skilled in the art uses known methods to calculate the existing amount of hydroxy groups. The person skilled in the art and carrying out the process of the invention then knows the average block length and the number of hydroxy groups in the polybiphenyl sulfone polymer blocks, and selects the amount of components (B1) and (B2) in accordance with the desired block lengths of the blocks resulting from step (b). The statistical rules of polycondensation, of which the person skilled in the art is aware, determine the average block length of the blocks resulting from step (b).

The process of the invention preferably leads to block copolymers having a defined multiblock structure.

The molar ratio of component (B2) to component (B1) is preferably from 1 to 1.2, in particular from 1.005 to 1.1, and particularly preferably from 1.01 to 1.05. The higher the molar ratio, the lower the block length of the block resulting from components (B1) and (B2). The person skilled in the art is aware of the appropriate relationships.

The person skilled in the art selects the molar amount of components (B1) and (B2) as a ratio to the molar amount of components (A1) and (A2) in such a way that the desired ratio is obtained between the block lengths of the blocks from step (a) and the blocks from step (b).

The reaction of the starting compounds takes place by analogy with step (a), preferably in the presence of a base (Ba), in order to increase reactivity to the halogen substituents of the starting compounds (B2). It is preferable, starting from the abovementioned aromatic dihydroxy compounds (B1), first to produce their dipotassium or disodium salts by adding a base (Ba), and then react these with component (B2).

The bases are preferably anhydrous. Particularly suitable bases are anhydrous alkali metal carbonate, preferably sodium carbonate, potassium carbonate, or calcium carbonate, or a mixture of these, very particular preference being given to potassium carbonate, in particular fine-particle potassium carbonate. A particularly preferred combination is N-methyl-2-pyrrolidone as solvent and potassium carbonate as base.

The base (Ba) is preferably used in excess in a molar ratio of from 1.01 to 1.3 in relation to the molar amount of component (B1).

The reaction of the starting compounds (B1) and (B2) and the reaction product from step (a) is usually carried out at a temperature of from 80 to 250° C., preferably from 100 to 220° C., with an upper temperature limit imposed by the boiling point of the solvent.

The reaction time according to step (b) is preferably from 1 to 12 h, in particular from 3 to 8 h.

It has also proven advantageous, for the purposes of step (b), to adjust the amount of the resultant polyarylene ether block copolymer, based on the total weight of the mixture composed of polybiphenyl sulfone polymer and solvent, to from 10 to 80% by weight, preferably from 15 to 50% by weight.

In another preferred embodiment, which can advantageously be linked to the abovementioned embodiments, after step (b), a reaction takes place according to step (c) with at least one organic halogen compound. This results in further reaction of reactive hydroxy end groups and thus inhibits further growth of polymer chain size during processing.

The organic halogen compound is preferably an alkyl halide, in particular an alkyl chloride, particularly preferably methyl halide, in particular methyl chloride.

It has proven advantageous, following step (b) and optionally step (c), to filter the polymer solution. This removes the salt content formed during the polycondensation reaction, and also any gel that may have formed.

The block copolymer is preferably obtained via precipitation in a suitable precipitant. The precipitant used is in particular a mixture of water and NMP, preferably a mixture of water and NMP in a ratio of from 5:1 to 15:1. The resultant product is usually then washed and dried. The person skilled in the art is aware of appropriate drying methods.

The present invention further provides polyarylene sulfone block copolymers obtainable by the process of the invention.

The polymer-bonded chlorine content of the polybiphenyl sulfone block copolymers of the invention is preferably less than 800 ppm, in particular less than 750 ppm, particularly preferably less than 700 ppm. Because of process-related factors, the lower limit of polymer-bonded chlorine content is usually at least 400 ppm, in particular at least 500 ppm.

The chlorine content of the polymer that can be obtained corresponds to the content of chloro end groups and is determined for the purposes of the present invention by means of atomic spectroscopy. For the purposes of the present invention, polymer-bonded chlorine content is in principle based on proportion by weight, and as an alternative it can be stated in mg per kg of initial polymer weight.

Polymer-bonded chlorine content in polymer compositions obtainable by the process of the invention is particularly preferably less than 700 ppm, with particularly preferably simultaneous residual solvent content of less than 500 ppm.

The polyarylene sulfone block copolymers of the invention are particularly suitable for the production of moldings, fibers, films, or foams.

The examples below provide further explanation of the invention but do not restrict the same.

EXAMPLES

The intrinsic viscosity of the polyphenylene sulfones was determined in 1% strength solution in N-methylpyrrolidone, at 25° C.

Tensile tests were carried out to ISO 527, and notched impact resistance was determined to ISO 179 1eA.

The purity of the monomers used (4,4'-dichlorodiphenyl sulfone, 4,4'-dihydroxybiphenyl, 4,4'-dihydroxydiphenyl sulfone) was more than 99.5%.

Comparative Example Comp. 1

Production of a block copolymer comprising PPSU and polyether sulfone (PPSU-b-PES) by the 2-stage process a) Synthesis of PPSU having OH Groups PPSU was obtained via nucleophilic aromatic polycondensation from 551.62 g (1.9215 mol) of 4,4'-dichlorodiphenyl sulfone and 372.42 g (2.000 mol) of 4,4'-dihydroxybiphenyl, using 284.71 g (2.06 mol) of potassium carbonate in 2000 ml of NMP. This mixture was kept at 180° C. for 6 hours. The mixture was then diluted by adding 1000 ml of NMP. The suspension was discharged after cooling to 80° C.

A portion of the material was worked up, i.e. the solid constituents were separated by filtration and the polymer was isolated by precipitation in 1/9 NMP/water. The product was carefully washed with water and then dried for 12 h at 120° C. in vacuo.

The IV of the product was 44.5 ml/g, with 0.019% by weight of Cl and 0.22% by weight of OH. Assuming that no other end groups are present, the result was therefore a number-average molar mass (Mn) of 15 313 g/mol.

b) Synthesis of PES having Cl end Groups

PES was obtained via nucleophilic aromatic polycondensation from 574.16 g (2.000 mol) of 4,4'-dichlorodiphenyl sulfone and 477.64 g (1.9092 mol) of 4,4'-dihydroxydiphenyl sulfone, using 290.24 g (2.100 mol) of potassium carbonate in 1050 ml of NMP. This mixture was kept at 190° C. for 8 hours. The mixture was then diluted by adding 1950 ml of NMP. The suspension was discharged after cooling to 80° C. A portion of the material was worked up, i.e. the solid constituents were separated by filtration and the polymer was isolated by precipitation in 1/9 NMP/water. The product was carefully washed with water and then dried for 12 h at 120° C. in vacuo.

The IV of the product was 41.5 ml/g, with 0.576% by weight of Cl and 0.010% by weight of OH. Assuming that no other end groups are present, the result was therefore Mn=11 913 g/mol.

Synthesis of Block Copolymer 632.88 g of suspension from a) (15.57 mmol of OH) and 421.46 g of suspension from b) (15.57 mmol of Cl) were combined in a 4 l flask and heated to 190° C. for 4 hours. Every hour during the reaction time, a specimen was withdrawn and IV determined. After 4 hours, the suspension was cooled to 130° C., and methyl chloride was then introduced for one hour (15 l/h), and the mixture was cooled and discharged. The solid constituents were then separated by filtration, and the polymer was isolated by precipitation in 1/9 NMP/water. The product was carefully washed with water and then dried for 12 h at 120° C. in vacuo.

Table 1 lists the properties of this product.

Comparative Example Comp. 2

Production of PPSU-b-PES by the 2-Stage Process a) Synthesis of PPSU having OH Groups PPSU was obtained via nucleophilic aromatic polycondensation from 529.95 g (1.846 mol) of 4,4'-dichlorodiphenyl sulfone and 372.42 g (2.000 mol) of 4,4'-dihydroxybiphenyl, using 284.71 g (2.06 mol) of potassium carbonate in 2000 ml of NMP. This mixture was kept at 180° C. for 6 hours. The mixture was then diluted by adding 1000 ml of NMP. The suspension was discharged after cooling to 80° C.

A portion of the material was worked up, i.e. the solid constituents were separated by filtration and the polymer was isolated by precipitation in 1/9 NMP/water. The product was carefully washed with water and then dried for 12 h at 120° C. in vacuo.

The IV of the product was 25.3 ml/g, with 0.009% by weight of Cl and 0.67% by weight of OH. Assuming that no other end groups are present, the result was therefore Mn=5042 g/mol.

b) Synthesis of PES having Cl end Groups

PES was obtained via nucleophilic aromatic polycondensation from 574.16 g (2.000 mol) of 4,4'-dichlorodiphenyl sulfone and 455.94 g (1.8225 mol) of 4,4'-dihydroxydiphenyl sulfone, using 290.24 g (2.100 mol) of potassium carbonate in 1050 ml of NMP. This mixture was kept at 190° C. for 8 hours. The mixture was then diluted by adding 1950 ml of NMP. The suspension was discharged after cooling to 80° C. A portion of the material was worked up, i.e. the solid constituents were separated by filtration and the polymer was isolated by precipitation in 1/9 NMP/water. The product was carefully washed with water and then dried for 12 h at 120° C. in vacuo.

The IV of the product was 25.5 ml/g, with 1.19% by weight of Cl and 0.010% by weight of OH. Assuming that no other end groups are present, the result was therefore Mn=5857 g/mol.

Synthesis of Block Copolymer PPSU-b-PES 5 k/5 k 625.90 g of suspension from a) (46.90 mmol of OH) and 609.31 g of suspension from b) (46.90 mmol of Cl) were combined in a 4 l flask and heated to 190° C. for 4 hours. Every hour during the reaction time, a specimen was withdrawn and IV determined. After 4 hours, the suspension was cooled to 130° C., and methyl chloride was then introduced for one hour (15 l/h), and the mixture was cooled and discharged.

The solid constituents were then separated by filtration, and the polymer was isolated by precipitation in 1/9 NMP/water. The product was carefully washed with water and then dried for 12 h at 120° C. in vacuo.

Table 1 lists the properties of this product.

Inventive example 3: Synthesis of Block Copolymers by the Single-Stage Process (PPSU-b-PES 10 k/10 k)

A PPSU was first produced via reaction of 275.81 g (0.9607 mol) of 4,4'-dichlorodiphenyl sulfone and 186.21 g (1.000 mol) of 4,4'-dihydroxybiphenyl, using 142.36 g (1.03 mol) of potassium carbonate in 1000 ml of NMP at 180° C. Reaction time 6 h. A further 500 ml of NMP and 287.08 g (1.0000 mol) of 4,4'-dichlorodiphenyl sulfone, 238.82 g (0.9546 mol) of 4,4'-dihydroxydiphenyl sulfone, and 145.12 g of potassium carbonate were then added. The suspension was then stirred at 190° C. for a further 6 h. The mixture was then cooled to 130° C. and reacted with methyl chloride for 1 h (15 l/h). The mixture was then diluted with 1500 ml of NMP and the suspension was discharged after cooling to 80° C.

The solid constituents were separated by filtration, and the polymer was isolated by precipitation in 1/9 NMP/water. The product was carefully washed with water and then dried for 12 h at 120° C. in vacuo.

Table 1 lists the properties of the product.

Inventive example 4: Synthesis of Block Copolymers by the Single-Stage Process (PPSU-b-PES 5 k/5 k)

A PPSU was first produced via reaction of 264.97 g (0.9230 mol) of 4,4'-dichlorodiphenyl sulfone and 186.21 g (1.000 mol) of 4,4'-dihydroxybiphenyl, using 142.36 g (1.03 mol) of potassium carbonate in 1000 ml of NMP at 190° C. Reaction time 6 h. A further 500 ml of NMP and 287.08 g (1.0000 mol) of 4,4'-dichlorodiphenyl sulfone, 227.97 g (0.9113 mol) of 4,4'-dihydroxydiphenyl sulfone, and 145.12 g of potassium carbonate were then added. The suspension was then stirred at 190° C. for a further 6 h. The mixture was then cooled to 130° C. and reacted with methyl chloride for 1 h (15 l/h). The mixture was then diluted with 1500 ml of NMP and the suspension was discharged after cooling to 80° C.

The solid constituents were separated by filtration, and the polymer was isolated by precipitation in 1/9 NMP/water. The product was carefully washed with water and then dried for 12 h at 120° C. in vacuo.

Table 1 lists the properties of the product.

The intrinsic viscosity of the polymers was determined in 1% strength solution in N-methylpyrrolidone at 25° C.

The products obtained were pelletized at a melt temperature of 385° C. in a twin-screw extruder (PTW 18). The material was processed to give test specimens at a melt temperature of 385° C. and a mold temperature of 160° C.

Notched impact resistance was determined to ISO 179 1eA, on ISO specimens. Transparency and haze were determined on discs of thickness 2 mm to DIN 53236 (transparency) and ASTM D1003 (haze).

TABLE 1

| Experiment | comp. 1 | comp. 2 | 3 | 4 |
|---|---|---|---|---|
| Molecular weight of blocks (theoretical) | 10k/10k | 5k/5k | 10k/10k | 5k/5k |
| IV [ml/g] | 74.0 | 63.1 | 97.6 | 94.7 |
| ak [kJ/m$^2$] | 11.9 | 10.8 | 20.2 | 18.9 |
| Transparency [%] | 83.2 | 84.1 | 86.1 | 86.2 |
| Haze [%] | 6.8 | 6.7 | 4.2 | 3.9 |

The process of the invention therefore permits the production of high-molecular-weight polyarylene ether copolymers with high notched impact resistance. The products produced by the process of the invention moreover have better optical properties.

The invention claimed is:

1. A process for the production of polyarylene ether block copolymers comprising
   (a) the reaction of components
      (A1) composed of at least one aromatic dihydroxy compound and
      (A2) composed of at least one 4,4'-dihalodiphenyl sulfone
   to form a reaction mixture comprising a polybiphenyl sulfone polymer, where component (A1) comprises at least 80% by weight of 4,4'-dihydroxybiphenyl and the reaction according to step (a) is carried out with a molar excess of component (A1), and then
   (b) reaction of the reaction mixture of step (a) with components
      (B1) composed of at least one aromatic dihydroxy compound and
      (B2) composed of at least one aromatic dihalogen compound, where the reaction of the starting compounds (A1) and (A2) takes place in the presence of anhydrous alkali metal carbonate wherein the molar ratio of component (A1) to (A2) in step (a) is from 1.005:1 to 1.2:1, and wherein the aromatic dihalogen compound (B2) is selected from dihalodiphenyl sulfones.

2. The process according to claim 1, where component (A1) is only 4,4'-dihydroxybiphenyl.

3. The process according to claim 1, where component (A2) is 4,4'-dichlorodiphenyl sulfone.

4. The process according to claim 1, where component (B2) is 4,4'-dichlorodiphenyl sulfone.

5. The process according to claim 1, where component (B1) is 4,4'-dihydroxydiphenyl sulfone.

6. The process according to claim 1, where the reaction in step (a) and in step (b) takes place in a solvent which comprises NMP.

7. The process according to claim 1, where the anhydrous alkali metal carbonate is used in a molar ratio of from 1 to 1.3, based on the molar amount of component A1.

8. The process according to claim 1, where the reaction of the starting compounds (A1 and A2) is carried out at a temperature of from 80 to 250° C.

9. The process according to claim 1, where the reaction takes place within a period of from 1 to 12 h.

10. The process according to claim 1, wherein the aromatic dihalogen compound (B2) is selected from 4,4'-dihalodiphenyl sulfones.

11. The process according to claim 1, where the aromatic dihalogen compound (B2) is selected from 4,4'-dichlorodiphenyl and 4,4'-diflourodiphenyl sulfone.

12. The process according to claim 1, where the molar ratio of component (B2) to compound (B1) is from 1 to 1.2.

13. The process according to claim 10, where the molar ratio of component (B2) to component (B1) is from 1.005 to 1.1.

14. The process according to claim 10, where the base (Ba) is added immediately to the reaction mixture from step (a).

* * * * *